A. E. O'BRIEN.
ANTIFRICTION DEVICE.
APPLICATION FILED OCT. 9, 1915.
1,212,992.
Patented Jan. 16, 1917.
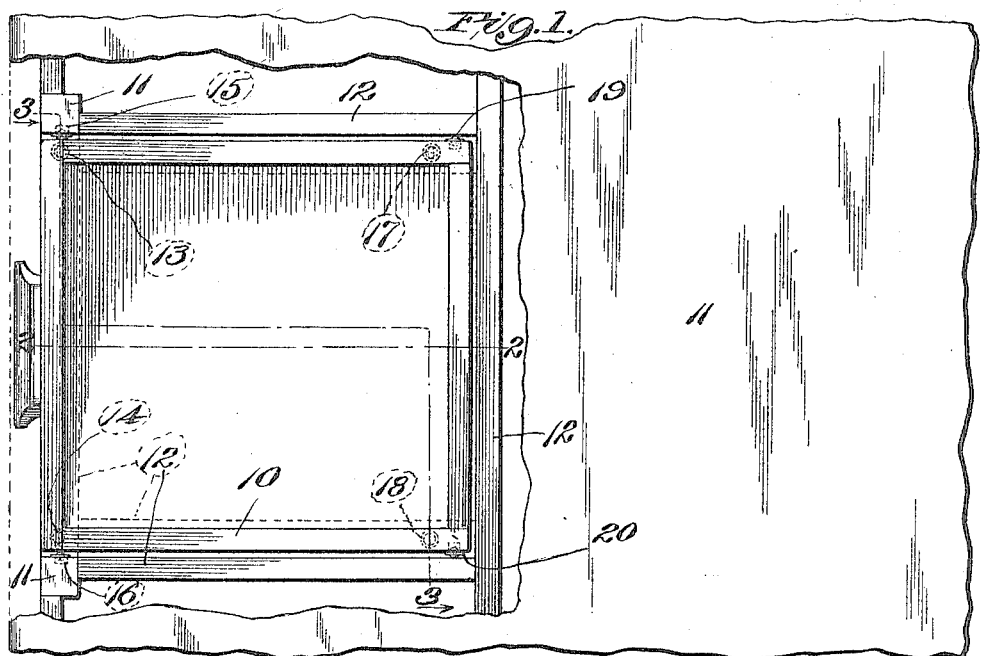
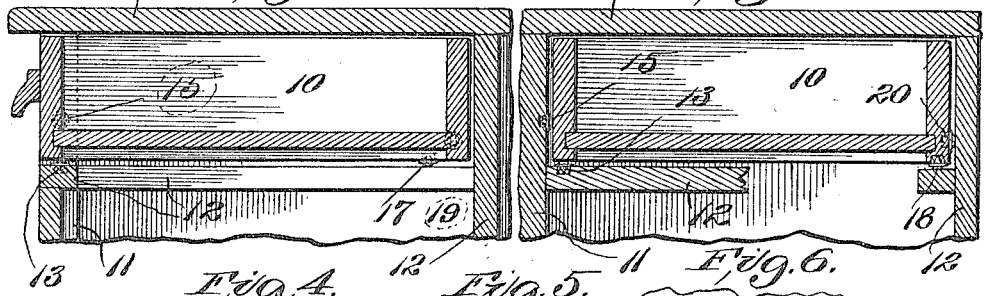
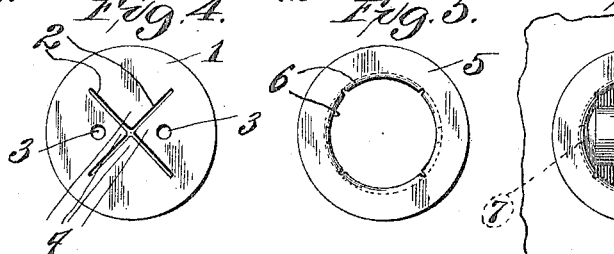
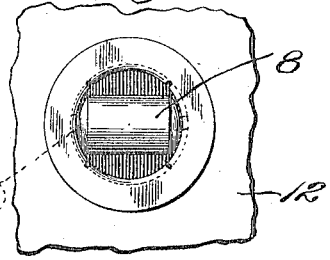
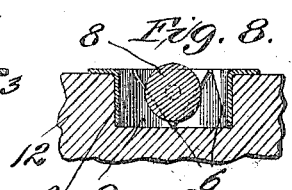
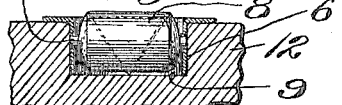
Inventor:
Adelaide E. O'Brien
by Hugh H. Wagner
her Attorney.

UNITED STATES PATENT OFFICE.

ADELAIDE E. O'BRIEN, OF ST. LOUIS, MISSOURI.

ANTIFRICTION DEVICE.

1,212,992.  Specification of Letters Patent.  Patented Jan. 16, 1917.

Application filed October 9, 1915.  Serial No. 55,045.

*To all whom it may concern:*

Be it known that I, ADELAIDE E. O'BRIEN, a citizen of the United States, residing at the city of St. Louis, in the State of Missouri, have invented certain new and useful Improvements in Antifriction Devices, of which the following is a specification.

This invention relates to improvements in desks, dressers, bureaus, cabinets, extension tables, and other pieces of furniture having sliding drawers, sliding parts, or other movable members, and has for its object to provide the drawers, sliding parts, or other movable members with improved anti-friction devices which are adapted to facilitate the operation of opening and closing said drawers, the sliding of said parts, and the movement of said members.

An advantage of the present invention resides in the provision of a simple and inexpensive anti-friction device of the character described that can be readily applied to a piece of furniture without the necessity of using nails, screws, or the like for holding the device in place.

In furniture manufactured without having its drawers, sliding parts, and other movable members equipped in construction with anti-friction devices, it often occurs that, through use, wear caused by abrasion of parts, weather conditions, imperfect construction, and other causes, the drawers, said parts, and the movable members bind, become difficult to operate, and will not slide or move freely causing much annoyance and inconvenience to the user, and, to remedy such defects when they arise, the simple anti-friction devices of this invention may be readily applied in appropriate positions at comparatively insignificant expense. With at least equal facility said devices may be very economically applied in connection with the drawers, sliding parts, and other movable members of furniture when same is being manufactured, thus producing a finished article that will give great satisfaction to the user.

In other words, the present invention provides comparatively inexpensive anti-friction devices so simple in construction that they may be applied very readily in connection with the drawers, sliding parts, and movable members of furniture either at the time said furniture is being constructed or at any time after its manufacture.

Further, the present invention consists of the novel features of construction and arrangement of parts described in this specification and pointed out in the claims.

In the accompanying drawings forming part of this specification, wherein like numbers of reference denote like parts wherever they occur, Figure 1 is a fragmentary plan view showing the anti-friction devices of this invention applied in connection with a piece of furniture having a sliding drawer operatively associated therewith; Fig. 2 is a sectional view on the line 2—2, Fig. 1; Fig. 3 is a sectional view on the staggered line 3—3, Fig. 1; Fig. 4 is a plan view of a perforated disk showing a preliminary stage in the construction of a part of the device embodying the present invention; Fig. 5 is a plan view illustrating another stage in the construction of the part shown in Fig. 4; Fig. 6 is a plan view of the completed device in place in association with a piece of furniture, said piece of furniture being shown in fragment; Fig. 7 is a vertical sectional view of Fig. 5; Fig. 8 is a vertical sectional view of Fig. 6 on a line transversely of the roller; and Fig. 9 is a vertical sectional view of Fig. 6 longitudinally of the roller, said roller being shown in plan elevation.

A convenient form of the anti-friction device embodying the present invention, and its construction, is best seen in detail in Figs. 4 to 9, inclusive, and consists of a disk 1, which may be made of sheet metal of any suitable texture, said disk being provided with two diametral cuts 2 therethrough, said cuts intersecting each other at substantially a right angle at the center of the disk and terminating at a predetermined distance from its periphery, there being, also, provided a pair of oppositely disposed perforations 3, each formed in one of the segmental portions 4 outlined by said intersecting cuts 2, said perforations being located on corresponding radii at a predetermined distance from the center of the circumference of the disk, the construction of said disk provided with said cuts and perforations being best seen in Fig. 4. The segmental portions 4 outlined by said intersecting cuts 2 are then bent outwardly from the center of disk 1 to form a rim or flange 5 bearing lateral members 6 depending from the inner edge of said flange substantially at a right-angle thereto, said inner edge preferably defining a circular opening with the lateral members 6 therearound, said members bent as described being adapted to form lateral walls of a substantially cylindrical-shaped recess open at both ends, said flange 5 with lateral members 6 depending therefrom being best seen in Figs. 5 to 9, inclusive. Segmental portions 4 having been bent to form said lateral members 6, perforations 3 will be disposed opposite to, and in alinement with, each other, said perforations so disposed being adapted to provide bearings for rotatably supporting trunnions 7 therein, which trunnions are rigidly borne by roller 8 axially thereof, said roller being operatively mounted in said recess by means of said trunnions inserted in said perforations. Perforations 3 are so disposed with reference to the height of the walls formed by lateral members 6 that, when roller 8 is rotatably mounted between said walls with trunnions 7 supported in said perforations, a portion of the periphery of the roller will extend slightly outwardly of said recess beyond the plane of the upper surface of flange 5 adjacent the attached ends of depending members 6 and, also, so that the opposite portion of said periphery will be in spaced relation to the plane which lies tangentially of the other ends of said members and which is substantially parallel to said first-named plane, the distance between said two planes being the depth of said recess formed by said depending members. The ends of roller 8 may be so rounded as to be substantially concentric with the circular opening formed by the inner edge of flange 5, and, by this construction and arrangement, best seen in Figs. 6 and 9, the roller operatively mounted in perforations 3 within said recess will rotate freely on its bearings without coming in contact with the walls formed by depending member 6 or with the inner edge of flange 5. It is, of course, understood that a roller with non-rounded ends may be used if made short enough axially and, also, that said ends of the roller may be appropriately beveled instead of rounded.

Disk 1 may be made of resilient metal so that roller 8 may be conveniently placed in mounted position in the recess formed by depending members 6 by means of springing the members 6 bearing perforations 3 wider apart than normal and, after having inserted said roller into said recess with trunnions 7 in position to enter perforations 3, permitting said members 6 to spring back to normal position with said trunnions inserted into said perforations, thereby holding said trunnions in said perforations. If desired, however, any other suitable metal may be used for said disk and any other suitable mode of mounting said roller in operative position may be practised. Moreover, if desired, flange 5 with depending members 6 provided with perforations 3 may be a casting.

For convenience and economy in manufacture, disk 1 may be cut out from a piece of thin sheet metal of any suitable texture and simultaneously with said operation intersecting cuts 2 and perforations 3 may be formed and, by a further continuing operation, segmental portions 4 may be bent to form flange 5 with depending members 6, it being, of course, understood that the outline described by the outer edge of said flange may vary in any suitable manner from the circular shape shown in the drawings, and, also, that the outline described by the inner edge of said flange and by said depending members may vary from the circular shape illustrated in the drawings. Furthermore, any other suitable arrangement of cuts 2, which cuts are herein described and shown in the drawings as being two intersecting diametral cuts, may be employed to provide a corresponding variation in the shape and number of the depending members adapted to form the lateral inclosure of the recess in which roller 8 is adapted to be operatively mounted for the purposes of this invention.

In order to apply this device to a piece of furniture or the like, an opening 9 is bored or otherwise formed in the part that is to support the device, which opening is preferably of such dimensions that depending members 8 will fit snugly and tightly against the adjacent sides thereof so that it will be necessary to force said members into said opening until the under side of flange 5 rests immediately against the material of said part adjacent the edge of said opening. Thus when the device is forced into place in said position relative to said opening it will be held securely and firmly in any operative position, without the use of screws, nails, tacks or the like, with the axis of roller 8 disposed substantially at a right-angle to the line of travel of the movable part, such, for instance, as drawer 10, with which it is associated, and, moreover, flange 5 will limit the inward movement of depending members 6 into opening 9 so that the peripheral portion of roller 8 extending outwardly beyond the outer surface of said flange will, also, extend beyond the adjacent surface of the part bearing said opening.

For more securely holding the device in place, the depth of opening 9 may be slightly less than the length of depending members 6 and the points of said members may be driven into the material at the bottom of said opening, it being, of course, understood that the depth of said opening must be sufficiently great so that, when the device is driven or forced into same as far as flange 5 will permit, there will be a space between the bottom of said opening and the adjacent peripheral portions of roller 8 to permit said roller to revolve freely on its bearings.

One or more of these devices may be applied to a piece of furniture in association with a drawer, sliding part, or other movable member and may be applied in any suitable position, positions, location, or locations, either on the stationary part adjacent said movable member or upon the movable part, or one or more of the devices may be applied to the stationary part and one or more to the movable part. A suitable disposition of a plurality of these devices as applied to a piece of furniture 11 having a drawer 10 opeartively supported on the frame 12 of the drawer-opening is illustrated in Figs. 1 to 3, inclusive, wherein a pair of the anti-friction devices embodying the present invention is applied to the lower frame of the drawer-opening adjacent the forward end of said opening at 13 and 14 so that the rollers of said pair of devices may operate upon the lower edge of the side of the drawer and another pair of said devices is applied to the opposite stationary side-frames of said drawer-opening at 15 and 16, respectively, adjacent said forward end of said opening and adapted to have their rollers operate respectively against the outer side surface of the adjacent side of the drawer and a third and fourth pair of said devices are applied to the rear end of the drawer at 16 and 17 and at 19 and 20, respectively, and are adapted to have their rollers operate against the adjacent stationary bottom frame and the adjacent stationary side frame, respectively, of the drawer opening.

It will be, of course, understood that the number, location, and position of the devices described as associated with drawer 10 is only by way of illustration and that same may be varied in any suitable manner and, moreover, it will be readily understood that this invention is not limited to the number or position or location of these anti-friction devices in connection with any particular drawer, sliding part, or movable member, but that there may be many variations in the number of these devices used and in their position and location.

When a piece of furniture or the like having a sliding drawer, a sliding member, or other movable part is equipped with an anti-friction device or devices of this invention, the friction which it is usually necessary to overcome in moving said drawer, member, or part in sliding relation with adjacent stationary parts of said piece of furniture is reduced to a minimum and said movement is greatly facilitated.

These anti-friction devices can be very cheaply manufactured and are readily and quickly applied to a piece of furniture and the like, one of the great advantages of these devices being that they are durable and when applied will remain in place in operative position without the necessity of using screws, nails, tacks, or the like for attaching them to the piece of furniture.

The anti-friction devices of this invention are shown in the drawings in connection with a sliding drawer only by way of illustration and it will readily be understood that they may, also, be applied with great advantage in connection with many other sliding parts of a piece of furniture and the like, such, for example, as in connection with a sliding desk-slab, card-table slab, shelf, bread-board, flexible apron for a roller-top desk, the sliding parts of an extension table, and the like.

Many changes in the details of construction and the arrangement and combination of parts may be made without departing from the nature and spirit of the present invention.

I claim:

1. An anti-friction device comprising a hollow open-ended member, consisting of a flange having a plurality of resilient V shaped members depending from its inner edge, and forming the walls defining said hollow member, certain of said resilient V shaped members being formed with a perforation, and a roller including a pair of trunnions rotatably mounted in the perforations of the hollow member, the perforation bearing resilient members adapted to be pressed apart in opposite directions to allow the trunnions to enter said perforations or to be removed therefrom.

2. In combination with a support having a pit, an anti-friction device comprising a hollow member open at each end and having a dentated lateral wall and a flange, said flange being borne adjacent the outer end of said hollow member and the dentations of said wall being directed away from said flange, and a roller revolubly mounted in said member, the points of said dentations being for driving engagement into the bottom wall of said pit in the support so as to extend in the latter beyond the pit to frictionally hold the hollow member in position therein.

3. In combination with a support having a pit, an anti-friction device comprising a hollow member open at each end and having a dentated lateral wall and a flange, said flange being borne by one end of said wall and being adapted to surround the opening at one of the ends of said member, the dentated portions of said wall extending away from said flange, and a roller revolubly mounted in said member and disposed so that its bottom is spaced away from the plane that lies tangentially of the points of said dentations, the points of said dentations being for driving engagement into the bottom wall of said pit in the support so as to extend in the latter beyond the pit frictionally to hold the hollow member in position in said pit.

4. In combination with a support having a pit, an anti-friction device comprising a hollow member open at each end and having a dentated lateral resilient wall and an annular flange extending therefrom, said flange being borne adjacent the outer end of said hollow member and the dentations of said resilient wall being directed away from said flange, and a roller revolubly mounted in the resilient member, said wall designed to be sprung into said pit for frictional engagement with the inner surface of the pit, said flange adapted to limit the depth that the wall may enter said pit.

5. In combination with a support having a pit, an anti-friction device comprising a hollow member open at each end and having a dentated lateral wall and a flange, said flange being borne adjacent the outer end of said hollow member and the dentations of said wall being directed away from said flange, and a roller revolubly mounted in said member, the extreme inner ends of said dentations being for driving engagement into the bottom wall formed by said pit in the support so as to extend in the latter beyond said pit to frictionally hold said hollow member in position, said flange being adapted to limit the depth to which said dentations may enter into said bottom wall.

In testimony whereof I hereunto affix my signature.

ADELAIDE E. O'BRIEN.